United States Patent [19]

Shine

[11] Patent Number: 5,156,360
[45] Date of Patent: Oct. 20, 1992

[54] FLEXIBLE FIRE SEAL FOR OVERLAPPING COWL SIDE EDGES

[75] Inventor: Paul R. Shine, Bellevue, Wash.

[73] Assignee: The Boeing Company, Seattle, Wash.

[21] Appl. No.: 682,621

[22] Filed: Apr. 8, 1991

[51] Int. Cl.⁵ .............................................. B64D 29/00
[52] U.S. Cl. .................... 244/129.1; 60/39.31; 49/483; 277/DIG. 6; 277/230; 277/235 B; 244/129.4
[58] Field of Search ............... 244/1 R, 53 R, 121.4, 244/129.5, 129.1, 131, 133; 277/DIG. 6, 229, 230, 234, 227, 235 B; 60/39.31; 49/483, 485

[56] References Cited

U.S. PATENT DOCUMENTS

| | | | |
|---|---|---|---|
| 3,466,804 | 9/1969 | Swaneck Jr. | 49/483 |
| 3,541,794 | 11/1970 | Johnston et al. | 60/39.31 |
| 3,788,651 | 1/1974 | Brown et al. | 277/DIG. 6 |
| 4,169,185 | 9/1979 | Bhatia | 277/DIG. 6 |
| 4,206,893 | 6/1980 | Howard | 244/54 |
| 4,219,203 | 8/1980 | Bellavia, Jr. et al. | 277/229 |
| 4,441,726 | 4/1984 | Uhl | 277/230 |
| 4,468,043 | 8/1984 | Brazel | 277/235 B |
| 4,683,717 | 8/1987 | Naud | 60/226.1 |
| 4,826,106 | 5/1989 | Anderson | 244/117 |
| 4,884,772 | 12/1989 | Kraft | 244/199 |
| 4,930,790 | 6/1990 | Sheridan | 277/12 |
| 5,046,689 | 9/1991 | Shine | 60/39.31 |

Primary Examiner—Galen Barefoot
Attorney, Agent, or Firm—Bruce A. Kaser

[57] ABSTRACT

An apparatus and method for preventing damage to overlapping cowl side edges (23, 25) in the event the cowls (3, 4) are closed in the wrong order. The underlapping edge (23) has a cut-out region (22) that is sufficiently large to permit at least a portion (11) of the overlapping edge (23) to pass therethrough if the cowls (3, 4) are closed in the wrong sequence. A flexible, fireproof seal (24) extends across the cut-out region (22), and maintained firewall integrity between the cowls (3, 4). The seal (24) is sufficiently flexible so as to not impede passage of the overlapping edge portion (11) through the cut-out region (22).

7 Claims, 4 Drawing Sheets

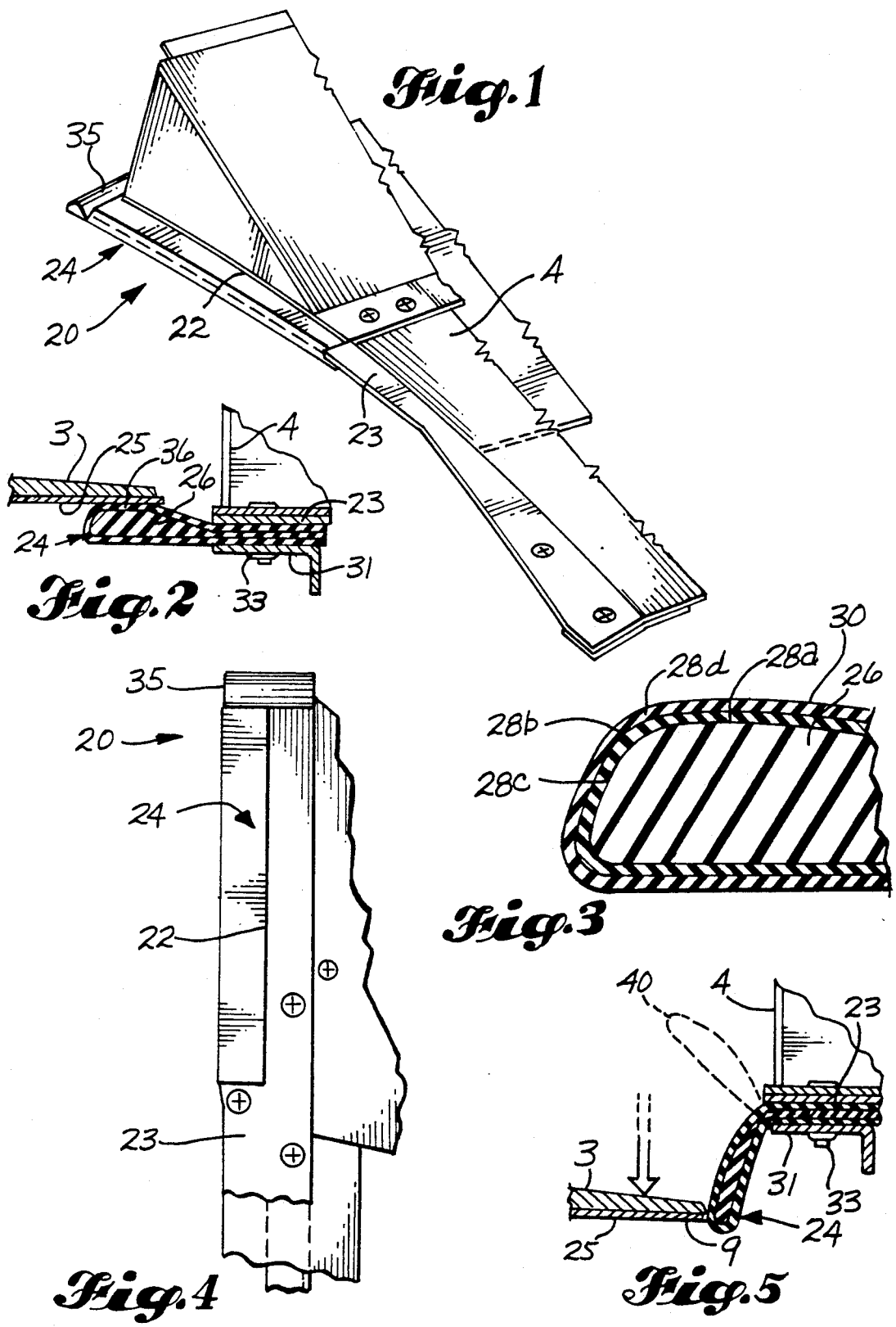

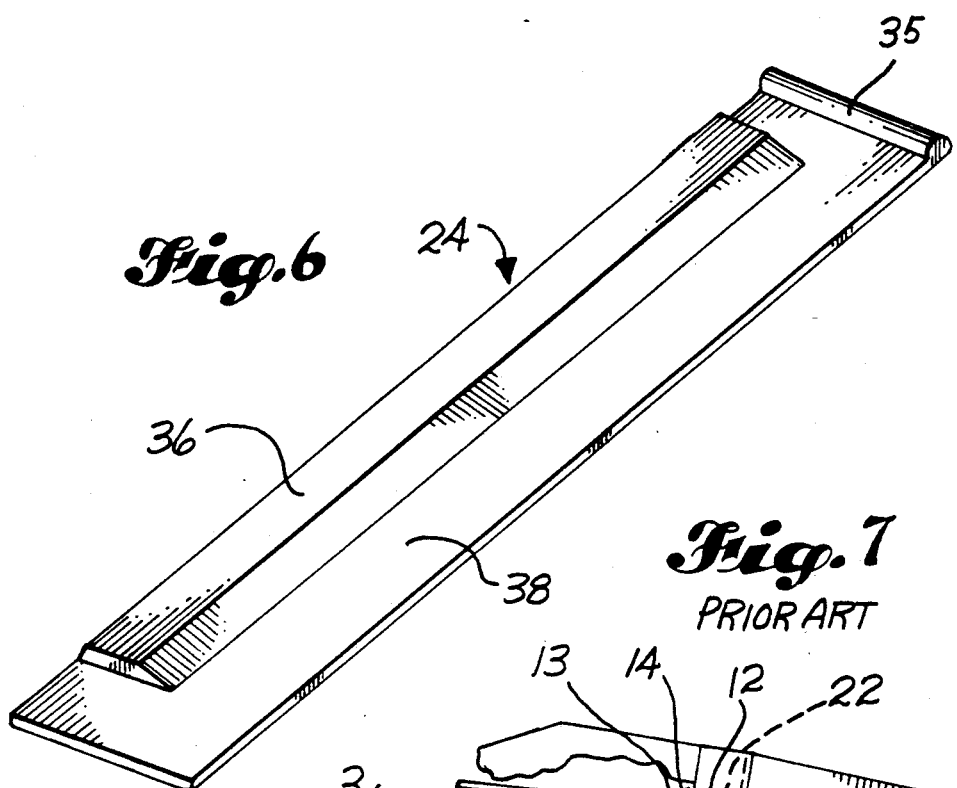
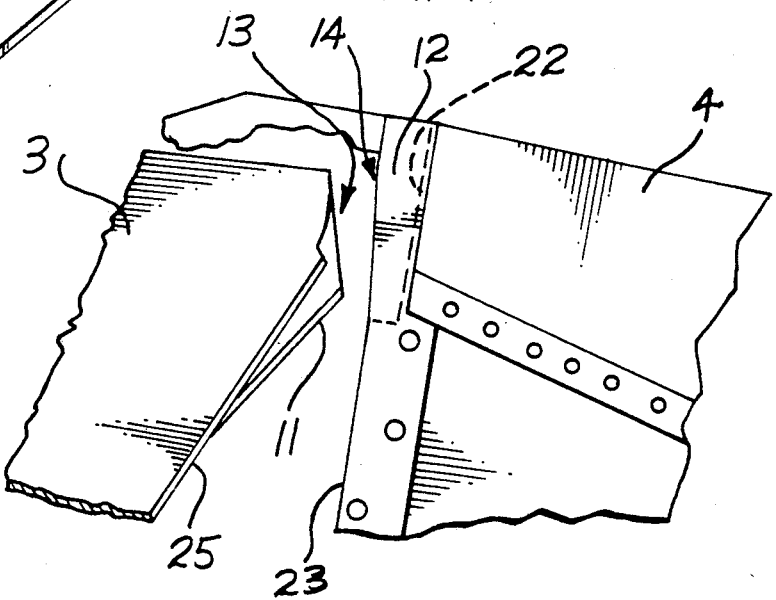
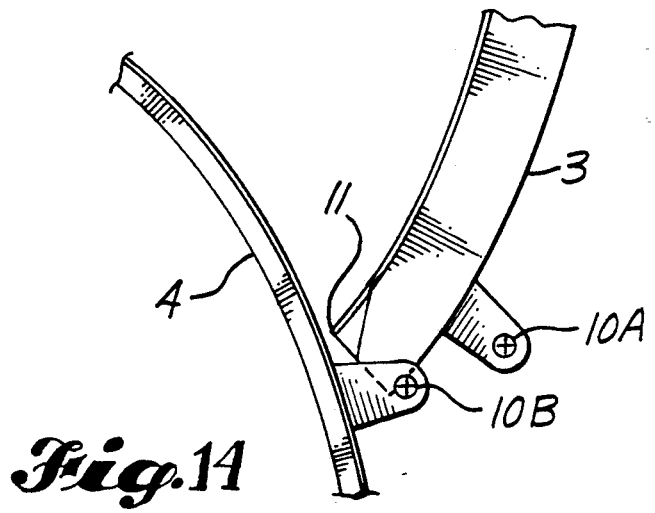

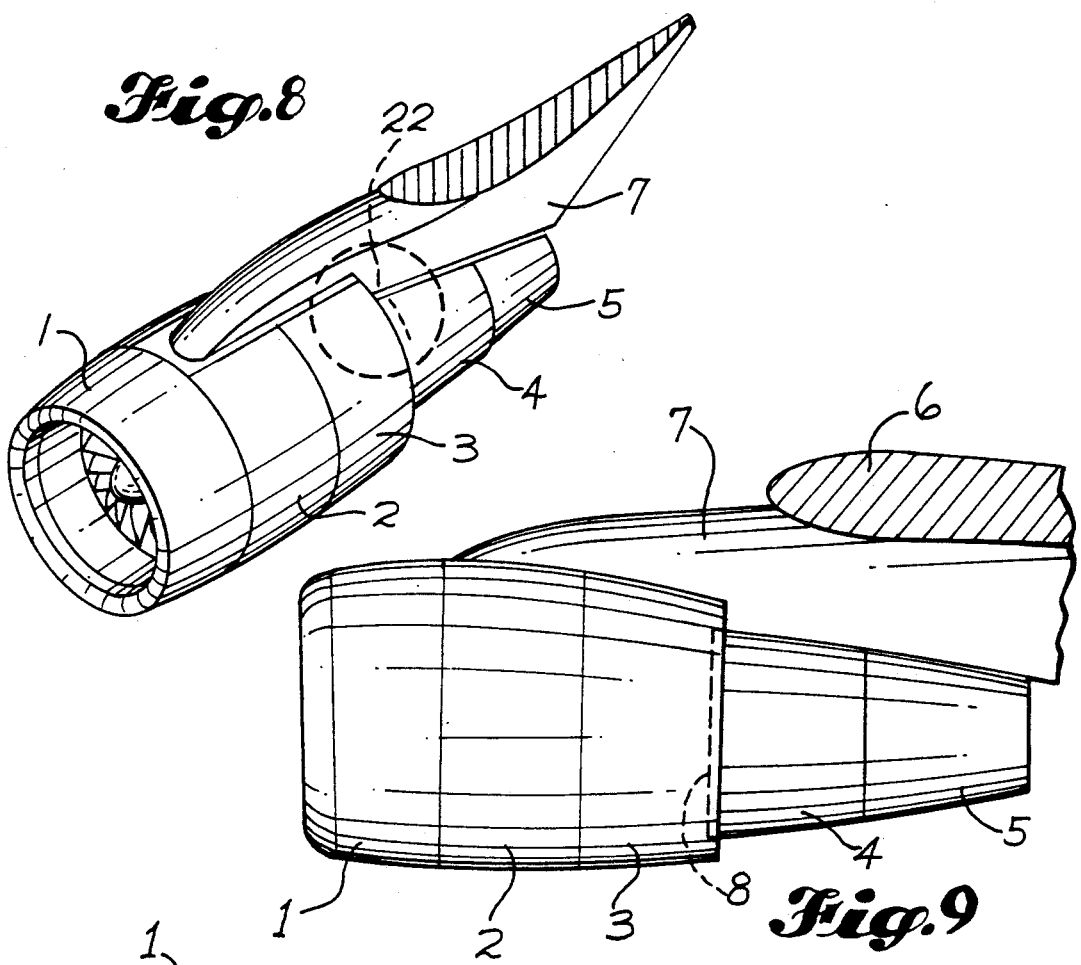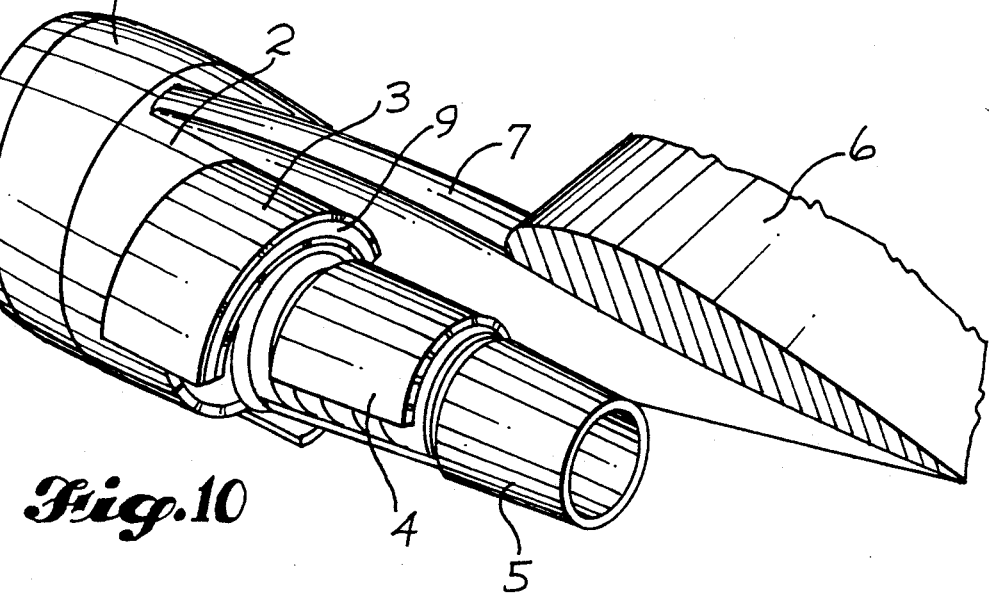

FLEXIBLE FIRE SEAL FOR OVERLAPPING COWL SIDE EDGES

DESCRIPTION

1. Technical Field

This invention generally relates to hinged aircraft cowls or cowlings, and to hoods, shields, and similar devices that function as structural coverings. More particularly, the invention relates to methods and devices for sealing adjacent or overlapping side edges of cowls that are positioned adjacent each other.

2. Background Art

Aircraft engine cowls or cowlings are generally in the form of metal coverings that make up a portion of the outer wall structure of an aircraft engine. The size and shape of such cowls vary according to engine design. It is common, however, for a given cowl to be hinge-mounted, and swingable between open and closed positions. The typical situation for opening a cowl is when a maintenance person needs to access underlying engine areas.

It is also common for an aircraft engine to have a plurality of cowls side-by-side along the engine's length. By way of example, U.S. Pat. No. 4,884,772, issued to Kraft on Dec. 5, 1989, illustrates one type of engine where a fan cowl 14 is located immediately forward and next to a fan duct cowl 15. Both cowls may be swung open to the position shown at 14a in FIG. 2 of the '772 patent.

FIGS. 8-10 herein are illustrative of another type of engine, which is known as the CF6-80C2 model engine manufactured by General Electric. Referring to FIGS. 8 and 9, for example, such engine has an inlet cowl 1, a fan cowl 2, a thrust reverser cowl 3, a core cowl 4, and a primary exhaust nozzle 5. The engine is mounted underneath a wing 6 by means of a strut 7. As shown by dashed line 8 in FIG. 9, the thrust reverser cowl 3 has a trailing edge portion that overlaps the leading side edge portion of the core cowl 4. Such edge is also shown at 9 in FIG. 10, which also shows the thrust reverser and core cowls 3, 4 in a partially open condition.

The above-described overlapping arrangement requires that the forward or thrust reverser cowl 3 be opened first and closed second relative to the aft or core cowl 4, at least when both cowls are intended to be open at the same time. Both cowls 3, 4 are swingable about their own individual hinge axes, although the hinge axis of the thrust reverser cowl 3 is offset relative to the core cowl 4. This is schematically illustrated in FIG. 14, where reference numeral 10A represents the hinge pivot axis for thrust reverser cowl 3, and reference numeral 10B illustrates the hinge axis for core cowl 4.

With respect to the CF6-80C2 engine, maintenance people have been known to close the cowls 3, 4 in the incorrect order. In other words, there have been times when a maintenance person closes the thrust reverser cowl 3 before the core cowl 4. In such situation, because of the overlapping relationship of the cowls, and their offset hinge axes, a portion of the trailing edge of the thrust reverser cowl, indicated at 11 in FIGS. 7 and 14, becomes jammed or binds against a portion of the core cowl's leading edge, which is indicated at 12 in FIGS. 7 and 11-12. This has been known to cause significant damage to both the thrust reverser and core cowls 3, 4, and in particular, to the areas indicated generally by arrows 13 and 14 in FIG. 7. Oftentimes, after the maintenance person realizes his mistake, he immediately attempts to raise the thrust reverser cowl 3, which tends to aggravate the damage already done.

It costs approximately $10,000.00 to $50,000.00 to repair the above-described cowl damage. To make matters worse, the damage is typically done at airports or flight service centers that are remotely located from the cowl manufacturer, or a facility otherwise having cowl repair capability. In order to avoid flight delays in such situation, service centers typically carry spare cowls that can be used as quick replacements. However, they are rented at rates of approximately $12,000.00 per day, until such time as the original cowl can be repaired or permanently replaced. A simple mistake by a maintenance person, therefore, can create a situation where many thousands of dollars of profits are lost. As will become apparent, the method and apparatus disclosed and claimed here addresses and solves this problem.

SUMMARY OF THE INVENTION

The present invention is a method and apparatus for preventing overlapping edges of cowls from binding against each other when the cowls are opened or closed in improper sequence. The invention is particularly well-suited for use in conjunction with aircraft engines having at least a pair of side-by-side hinged cowls positioned along an engine's length. In such situation, each cowl is typically swingable about its own hinge axis, between an open and closed position. When both of the cowls are closed, a trailing side edge on the forwardly-positioned cowl overlaps an adjacent leading side edge on the aft cowl. In this manner, the cowls cooperatively close a certain underlying area or region of the aircraft engine. However, the overlapping relationship of the edges requires the forward cowl to be opened first, but closed second, with respect to the aft cowl.

In accordance with the invention, in the event the cowls are closed in the wrong order, to avoid at least a portion of the overlapping trailing side edge of the forward cowl from binding against the leading side edge of the aft cowl, the leading side edge is provided with a cut-out region. This region is sized and shaped so that it is sufficiently wide and long enough to permit passage therethrough of that portion of the trailing side edge that would otherwise bind against the leading side edge.

A fireproof strip seal is attached to the leading side edge, and protrudes transversely across the cut-out region, to fill in for that structure which was removed by making the cut-out. The seal is sufficiently flexible so as to bend aside and not interfere with the overlapping trailing side edge as it passes through the cut-out region. Preferably, the seal is made of a flexible rubber material, and has an outer covering of a flexible fireproof material. It also includes intermediate, reinforcing layers of flexible fiberglass fabric between the rubber and outer covering.

The invention as summarized above, will become more clearly understood upon consideration of the following description, which is to be read in conjunction with the appended drawings.

BRIEF DESCRIPTION OF THE DRAWINGS

In the drawings, like reference numerals and letters refer to like parts throughout the various views, and wherein:

FIG. 1 is a fragmentary pictorial view of the leading side edge of a core cowl, and shows a flexible firewall seal positioned across a cut-out area of such side edge in accordance with the present invention;

FIG. 2 is a cross-sectional view of the edge and seal structure shown in FIG. 1, and further shows the trailing side edge of a thrust reverser cowl overlapping the seal;

FIG. 3 is an enlarged but fragmentary cross-section of the seal shown in FIG. 2;

FIG. 4 is a top plan view of the edge and seal structure shown in FIG. 1;

FIG. 5 is a view like FIG. 2, but shows how the firewall seal flexes and bends in order to avoid binding of the overlapping edge of the thrust reverser cowl with the leading edge of the core cowl, in the event such cowls are closed in improper order;

FIG. 6 is a pictorial view of the seal shown in FIGS. 1-5, but unattached to the core cowl;

FIG. 7 is a fragmentary pictorial view showing how the thrust reverser cowl binds against the core cowl when closed in the wrong order, and is labeled "prior art";

FIG. 8 is a pictorial view of an aircraft engine having an overlapping thrust reverser and core cowl;

FIG. 9 is a side view of the engine shown in FIG. 8;

FIG. 10 is a pictorial view of the engine shown in FIGS. 8 and 9, but looking at the engine from a rearward direction, and shows how the engine's thrust reverser and core cowls open relative to the engine;

FIG. 14 is a schematic view further illustrating how the damage shown in FIG. 11 occurs, but is taken looking along the hinge axis of the thrust reverser and core cowls.

BEST MODE FOR CARRYING OUT THE INVENTION

Figure 11:
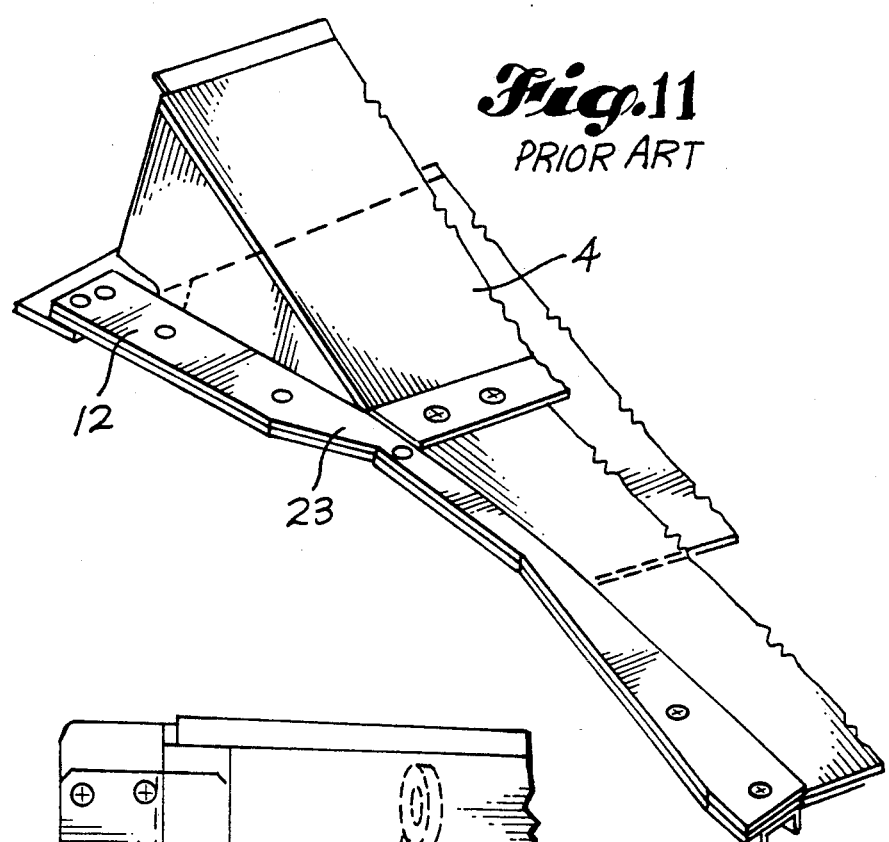
FIG. 11 is a view similar to FIG. 1, but shows the core cowl's leading edge prior to its modification in accordance with the present invention, and is labeled "prior art;"
Figure 12:
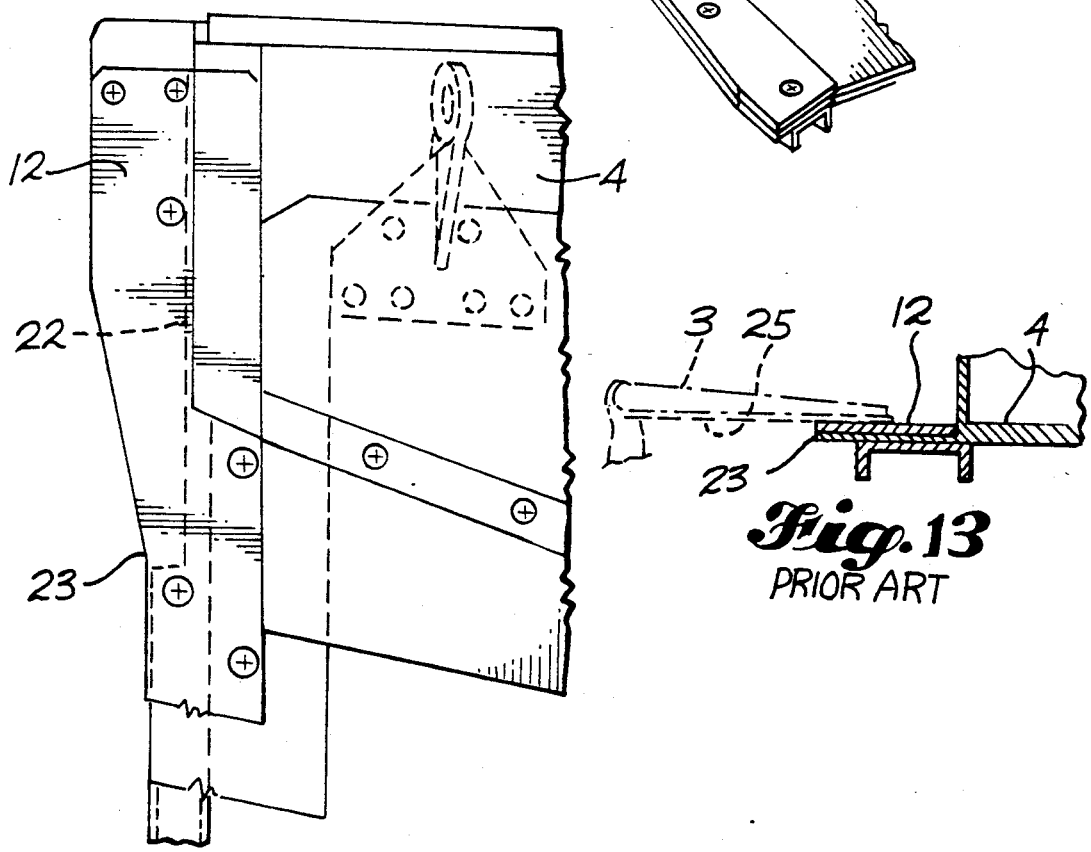
FIG. 12 is a top plan view of the prior art leading edge shown in FIG. 11.
Figure 13:
FIG. 13 is a cross-sectional view of the prior art leading side edge shown in FIGS. 11 and 12, and shows how the cowls of the engine shown in FIGS. 8-10 normally overlap when not modified by the present invention.

Referring now to the drawings, and first to FIG. 1, shown generally at 20 is a bind-free leading side edge system in accordance with a preferred embodiment of the invention. As mentioned above, the system 20 is constructed by cutting out a region 22 from the leading edge 23 of an aircraft engine core cowl or cowling 4. FIGS. 7, 8 and 12 indicate where the cut-out 22 is made relative to the leading edge 23 prior to its modification in accordance with the invention. The empty space created by the cut-out region 22 is filled or covered by a fireproof seal 24, as is best seen in FIGS. 1-3.

In preferred form, the seal 24 is made primarily of a rubber material 26, such as, for example, a silicon base synthetic rubber. The rubber 26 is reinforced by two layers of fiberglass fabric 28a, 28b (see FIG. 3). Thin layers of silicon rubber 28c, 28d are interposed between the fiberglass layers 28a, 28b, and enhance their flexibility. The fiberglass and silicon matrix 26a-d just described is further covered by an outer layer of fireproof fabric 30. Preferably, the fireproof outer layer is made of Nomex, which is a trademark of the DuPont Co.

The seal 24 is attached to the cowl leading edge 23 by a backing plate 31 that sandwiches the seal between the plate and the leading edge. The backing plate 31 is connected to the leading edge 23 by fasteners 33 (see FIGS. 2 and 5). The seal 24 closes the gap between cowl edges 23, 25 created by making the cut-out region 22 in the leading edge 23 (see FIG. 2), and also maintains firewall integrity between the two cowls 3, 4. FIG. 6 is a pictorial view of the seal 24, but unattached to the cowl 3. The seal has an enlarged edge bead portion 36 that underlays the thrust reverser's overlapping edge 9 (see FIG. 2), where cowl edge binding might occur. It also has thinner edge areas 38 that are used to attach it to the cowl 4 in the above-described manner. An aft edge portion 35 maintains firewall integrity with the intersection of the cowls 3, 4 and the engine strut 6.

Referring now to FIG. 5, when both cowls 3, 4 are open, and the thrust reverser cowl 3 is mistakenly closed first, that portion 11 of the thrust reverser cowl 3, which would otherwise bind against the core cowl's leading edge 23, passes through the cut-out 22. In doing so, it bends aside the seal 24, as shown in FIG. 5, the seal 24 being highly flexible as a result of its above-described construction. The maintenance person, upon realizing his or her mistake, simply reopens the thrust reverser cowl 3, and then recloses both cowls 3, 4 in the correct order. The seal 24, which has the capability of elastically bending 70° in either direction, as shown at 40 in FIG. 5, then resumes the configuration shown in FIG. 2, with no damage being done to either cowl 3, 4.

Having thus disclosed a preferred embodiment for carrying out the invention, it is to be understood that the above description is not to be taken in a limiting sense. It is conceivable that certain changes or improvements could be made to the flexible seal and cut-out region described above without departing from what is considered to be the spirit and scope of the invention. Consequently, the scope of the invention is to be limited only by the following patent claim or claims, wherein such claims are to be in interpreted in accordance with the well-established doctrines of patent claim interpretation.

What is claimed is:

1. On an aircraft engine having at least a pair of hinged cowlings, one positioned forwardly of the other, each of said cowlings being swingable about a hinge axis between an open and closed position, and when both of said cowlings are closed, a trailing side edge portion of said forward cowling overlaps an adjacent leading side edge portion of said aft cowling, thereby enabling said cowlings to cooperatively close a certain region of said aircraft engine, said overlapping trailing side edge portion normally requiring said forward cowling to be opened first but closed second with respect to opening and closing said aft cowling, in order to prevent at least some of said overlapping trailing side edge portion from binding against said leading side edge portion, and consequently damaging one or the other of said trailing and leading side edge portions, a method for preventing such damage in the event said cowlings are closed in the incorrect sequence, comprising:

making a cut-out in a certain region of said leading side edge portion of said aft cowling, said cut-out being sufficiently wide and long to permit said at least some of said overlapping trailing side edge portion that would otherwise bind against said leading side edge portion to pass through said cut-out region, in the event it is attempted to close said forward cowling while said aft cowling is open, and attaching a fireproof strip seal to said leading side edge portion of said aft cowling, said seal protruding transversely across said cut-out region, and being sufficiently elastically flexible so as to not interfere with said at least some of said overlapping trailing side edge portion as such portion passes through said cut-out region when said cowlings are closed in the incorrect sequence.

2. The method of claim 1, wherein said fireproof strip seal comprises a rubber material reinforced by at least one ply of a fiberglass fabric, and an outer fabric cover made of a fireproof material that substantially surrounds said rubber material and said fiberglass.

3. The method of claim 1, wherein said fireproof strip seal comprises a rubber material substantially surrounded by a plurality of plies of fiberglass fabric, and an outer fabric cover made of a fireproof material substantially surrounding said plies of fiberglass, including a thin layer of silicon rubber juxtaposed between said fiberglass plies, and also juxtaposed between the outermost fiberglass ply and said outer fabric cover.

4. The method of claim 2, wherein said rubber material is a silicon base rubber.

5. The method of claim 2, wherein at least two plies of fiberglass fabric substantially surrounds said rubber material, and said outer fabric cover is made of Nomax (trademark).

6. For use on a structure having at least a pair of adjacent hinged cowlings, each of said cowlings being swingable about a hinge axis between an open and closed position, and when both of said cowlings are closed, a side edge portion of one of said cowlings overlaps an adjacent side edge portion of said other cowling, thereby enabling said cowlings to cooperatively close a certain region of said structure, said overlapping side edge portions normally requiring one of said cowlings to be opened first but closed second with respect to the other, in order to prevent said overlapping side edge portions from binding against each other, a bind-free side edge system for preventing damage to one or the other of said cowling side edge portions in the event said cowlings are closed in the wrong order, said side edge system comprising:

a cut-out region in said side edge portion of one of said cowlings, said cut-out region being sufficiently wide and long to permit at least some of said overlapping side edge portion of said other cowling to pass through said cut-out region in the event said cowlings are closed in the wrong order; and a fireproof strip seal attached to said one cowling having said cut-out region, said strip seal extending laterally across said cut-out region, said seal defining a flexible side edge region of said one cowling that is sufficiently flexible so as to not interfere with said passage of said other cowling in the event said cowlings are closed in the wrong order.

7. The side edge system of claim 6, wherein said fireproof strip seal comprises a rubber material substantially surrounded by a plurality of plies of fiberglass fabric, and an outer fabric cover made of a fireproof material substantially surrounding said plies of fiberglass, including a thin layer of silicon rubber juxtaposed between said fiberglass plies, and also juxtaposed between the outermost fiberglass ply and said outer fabric cover.

* * * * *